United States Patent
Hansford et al.

(10) Patent No.: US 11,860,378 B2
(45) Date of Patent: Jan. 2, 2024

(54) SPECKLE REDUCTION

(71) Applicant: Oxford University Innovation Limited, Oxford (GB)

(72) Inventors: David J. Hansford, Oxford (GB); Julian A. J. Fells, Oxford (GB); Steve Elston, Oxford (GB); Stephen M. Morris, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 16/327,996

(22) PCT Filed: Aug. 16, 2017

(86) PCT No.: PCT/GB2017/052425
§ 371 (c)(1),
(2) Date: Feb. 25, 2019

(87) PCT Pub. No.: WO2018/037212
PCT Pub. Date: Mar. 1, 2018

(65) Prior Publication Data
US 2019/0196216 A1    Jun. 27, 2019

(30) Foreign Application Priority Data

Aug. 26, 2016    (GB) ........................... 1614571

(51) Int. Cl.
*G02B 27/48*    (2006.01)
*G02F 1/137*    (2006.01)
(Continued)

(52) U.S. Cl.
CPC ........... *G02B 27/48* (2013.01); *G02F 1/1375* (2013.01); *G02F 1/13718* (2013.01);
(Continued)

(58) Field of Classification Search
CPC ............................ G02B 27/48; G02F 2202/06
See application file for complete search history.

(56) References Cited

U.S. PATENT DOCUMENTS

| 3,650,608 | A | * | 3/1972 | Baker | .................. | G02B 27/48 |
| | | | | | | 353/69 |
| 4,128,312 | A | * | 12/1978 | Lim | ................... | C09K 19/582 |
| | | | | | | 252/299.3 |

(Continued)

FOREIGN PATENT DOCUMENTS

| CN | 104849932 A | * | 8/2015 |
| GB | 2 526 275 A | | 11/2015 |

(Continued)

OTHER PUBLICATIONS

International Search Report & Written Opinion for PCT/GB2017/052425, dated Nov. 7, 2017, pp. 1-13.

(Continued)

*Primary Examiner* — Paisley L Wilson
(74) *Attorney, Agent, or Firm* — Thomas|Horstemeyer, LLP

(57) ABSTRACT

A device (100) for speckle reduction, comprising an optical cell (110) and a controller (130). The optical cell (110) comprises a first and second cell wall (121, 122) spaced apart by a gap, and a liquid crystal composition (114) in the gap. The controller (130) is configured to cause fluid turbulence in the liquid crystal composition. The fluid turbulence in the liquid crystal composition (114) results in time varying spatially random scattering of light (102) transmitted through the liquid crystal composition (114). The liquid crystal composition (114) has a chiral nematic phase.

20 Claims, 11 Drawing Sheets

(51) Int. Cl.
G02F 1/1333 (2006.01)
G02F 1/1335 (2006.01)
G02F 1/1339 (2006.01)
G02F 1/1343 (2006.01)

(52) U.S. Cl.
CPC .... *G02F 1/133382* (2013.01); *G02F 1/13394* (2013.01); *G02F 1/13439* (2013.01); *G02F 1/13706* (2021.01); *G02F 1/13781* (2013.01); *G02F 1/13793* (2021.01); *G02F 1/133504* (2013.01); *G02F 2202/06* (2013.01); *G02F 2202/36* (2013.01)

(56) References Cited

U.S. PATENT DOCUMENTS

| | | | |
|---|---|---|---|
| 4,419,664 A * | 12/1983 | Crossland | G02F 1/13306 345/94 |
| 7,956,941 B2 * | 6/2011 | Khan | H04N 9/3129 349/33 |
| 2009/0033814 A1 | 2/2009 | Khan | |
| 2012/0140133 A1* | 6/2012 | Choi | G02F 1/13718 349/33 |
| 2012/0147279 A1 | 6/2012 | Koyanagi et al. | |

FOREIGN PATENT DOCUMENTS

| | | | |
|---|---|---|---|
| JP | 2010217291 A | 9/2010 | |
| WO | 2009/081989 A1 | 7/2009 | |
| WO | 2009081989 A1 | 7/2009 | |
| WO | WO-2009081989 A1 * | 7/2009 | ....... G02F 1/133504 |

OTHER PUBLICATIONS

UK Search Report for GB1614571.6, dated Feb. 16, 2017, pp. 1-4.
Hirokazu Furue, Atsuo Terashima, Masato Shirao, Yukio Koizumil, and Masatoshi Ono, "Control of Laser Speckle Noise Using Liquid Crystals", Japanese Journal of Applied Physics, 2071, vol. 50, 09NE14.1-t4.3, May 25, 2011, pp. 1-4.
Chellappan et al., "Laser-based displays: a review", 2010 Optical Society of America, Sep. 1, 2010/vol. 49, No. 25/Applied Optics, pp. 1-20.
Akram et al., "Speckle reduction methods in laser-based picture projectors", The Optical Society of Japan, 2015, Published online: Aug. 13, 2015, pp. 1-13.
Li, "Design of Optical Engine for Lcos Laser Display With Rotated Diffuser Plate", Microwave and Optical Technology Letters/vol. 55, No. 1, Jan. 2013, pp. 1-4.
Zhang et al., "Demonstration of a home projector based on RGB semiconductor lasers", Applied Optics/vol. 51, No. 16/Jun. 1, 2012, pp. 1-6.
Shin et al., "Removal of hot spot speckle on laser projection screen using both the running screen and the rotating diffuser", 2006 Elsevier B.V., Science Direct, pp. 1-6.
Sun et al., "Speckle suppression with a rotating light pipe", Optical Engineering, Feb. 2010/vol. 49(2), pp. 1-6.
Yao et al., "Low speckle laser illuminated projection system with a vibrating diffractive beam shaper", Optics Express, Jul. 16, 2012/vol. 20, No. 15, pp. 1-15.
Akrm et al., "Laser speckle reduction due to spatial and angular diversity introduced by fast scanning micromirror", Applied Optics, Jun. 10, 2010/vol. 49, No. 17, pp. 1-8.
Furue et al., "Control of Laser Speckle Noise by Using Polyer-Dispersed LC", Molecular Crystals and Liquid Crystals, Taylor & Francis, 612:1, 245-250, DOI: 10.1080/15421406.2015.1031999, Jul. 6, 2015, pp. 1-7.
Andreev et al., "Speckle-noise suppression due to a single ferroelectric liquid-crystal cell", Journal of the SID, 2009, Society for Information Display, pp. 1-7.
Andreev et al., "Speckle Reduction Due to using the Electro-optical Cell with Helix-free FLC", SID 2014 Digest, pp. 1-4.
Heilmeier et al., "A New Electric-Field-Controlled Reflective Optical Storage Effect in Mixed-Liquid Crystal Systems", AIP|Applied Physics Letters 13, 132 (1968), doi: 10.1063/1.1652540, pp. 1-3.
Helfrich, "Electrohydrodynamic and Dielectric Instabilities of Cholesteric Liquid Crystals", The Journal of Chemical Physics 55, 839 (1971), doi: 10.1063/1.1676151, pp. 1-5.
Jin et al., entitled "Laser Speckle Reduction using a Liquid Crystal Diffuser Enhanced with Redox Dopants", Department of Engineering Science, University of Oxford, Parks Road, Oxford, OX1 3PJ, United Kingdom, Jan. 2021, pp. 1-29.
Asahi., "Dynamic scattering mode", https://en.wikipedia.org/wiki/Dynamic_scattering_mode.
Examination Report for European Application No. 17 757 830.9, dated Apr. 13, 2022, pp. 1-25.
International Preliminary Report on Patentability for WO 2018/037212 (PCT/GB2017/052425), dated Feb. 26, 2019, pp. 1-8.
Heuer, Jana, et al. "Longitudinal and normal electroconvection rolls in a nematic liquid crystal with positive dielectric and negative conductivity anisotropy." Physical Review E 77.5 (2008): 056206.

* cited by examiner

SPECKLE REDUCTION

CROSS-REFERENCE TO RELATED APPLICATIONS

This application is the National Stage of International Application No. PCT/GB2017/052425, filed Aug. 16, 2017, which claims the priority to GB 1614571.6, filed Aug. 26, 2016, which are entirely incorporated herein by reference.

The invention relates to a device and method for speckle reduction comprising a liquid crystal.

Speckle is a well-known phenomenon that occurs when coherent laser light is reflected diffusely from an optically rough surface and imaged by an intensity detector with finite aperture, such as the eye. Any point in the observation plane may be subject to incident light from numerous spatially separated positions on the surface. The incident wave-fronts have a fixed phase relationship as a result of their coherence, which causes constructive and destructive interference. A stationary detector will observe a time invariant, high contrast, high spatial frequency speckle pattern superimposed upon the intended image. This phenomenon is often unwanted, particularly when laser sources are used in projection displays since important information in the intended image is often obscured. Lasers are a necessary requirement in applications such as holography, which is fundamentally a coherent imaging technique. There has been a considerable body of research dedicated to finding new techniques with which to reduce speckle.

In order to quantify the degree of speckle within an image, the speckle contrast parameter is typically used, which is defined as:

$$C = \frac{\sigma_i}{\bar{I}} = \frac{\sqrt{\langle I^2 \rangle - \langle I \rangle^2}}{\bar{I}}$$

where $\sigma_i$ is the standard deviation of the intensities, I is the intensity of an individual pixel and $\bar{I}$ is the mean intensity of the image. The speckle parameter C can take any value between 0 and 1, with 1 corresponding to fully developed speckle. A perfectly monochromatic laser with linear polarisation that is scattered from a depolarising white screen would have speckle contrast of $1/\sqrt{2}$. It has been reported that speckle contrast values of <0.04 are unperceivable to the eye, which provides a standard against which speckle reduction methods can be judged.

Ultimately, the phenomenon of speckle may not be possible to completely eliminate. Instead, the most commonly used methods of speckle reduction take advantage of the finite temporal response and spatial resolution of the detector to reduce observable speckle. The traditional approach to speckle reduction is the time averaging of N statistically independent speckle patterns, implying that the patterns have to be both non-interfering and uncorrelated. In the ideal case of N independent patterns, the speckle contrast can be reduced by a factor of $1/\sqrt{N}$. Creating independent patterns can be achieved through the diversification of properties such as incident angle, time, frequency, and polarization. A known method of reducing speckle is to use a rotating ground glass diffuser that creates a time-varying speckle pattern which, when averaged over a sum of N independent patterns, results in the smearing out of the effects of speckle. Other techniques for reducing the speckle contrast parameter include the use of a rotating rectangular light pipe, a vibrating diffractive beam shaper and fast scanning micromirrors.

These prior art methods all achieve a reduction in speckle contrast to C=0.04-0.075, but typically at the cost of additional bulky mechanical parts or expensive components, making them unsuitable or undesirable for applications that require a compact and vibration free solution such as laser-based pico-projectors.

An alternative approach that utilises the electro-optical properties of certain Liquid Crystal (LC) phases has recently been reported. For example, Furue, Hirokazu, et al. *"Control of laser speckle noise using liquid crystals."* Japanese Journal of Applied Physics 50.9S2 (2011) reported a 40% speckle reduction as a result of applying an alternating square-wave electric field to a ferroelectric LC, combined with a wedge cell and polariser. In this disclosure a LC device is switched between a first and second state. In the first state the laser light is passed substantially without modification, and in the second state the plane of linearly polarised light is rotated by 90 degrees. The resulting speckle pattern for a linearly polarised laser passing through the switching LCD is a combination of the two speckle patterns that are produced for each polarisation state. This approach emphasises maintaining coherence of the laser light by avoiding optically diffusive effects. The same authors have more recently reported a 25% speckle reduction with an electrically addressed polymer-dispersed nematic LC device (Furue, Hirokazu, et al. *"Control of Laser Speckle Noise by Using Polymer-Dispersed LC."* Molecular Crystals and Liquid Crystals 612.1 (2015): 245-250).

Andreev et al have reported 50% speckle reduction with the application of more complicated waveforms to a helix-free ferroelectric LC (Andreev, Alexander L., Tatiana B. Andreeva, and Igor N. Kompanets. "31.1: *Speckle Reduction Due to using the Electro-optical Cell with Helix-free FLC."* SID Symposium Digest of Technical Papers. Vol. 45. No. 1. 2014). In this disclosure the mechanism of speckle reduction is based on electrically controlled formation of small-scale randomly-distributed gradients of the refractive index in the ferroelectric LC layer.

Although these previous efforts to solve the problem of speckle show promise, considerable room for improvement remains.

According to a first aspect, there is provided a device for speckle reduction, comprising an optical cell, comprising: a first and second cell wall spaced apart by a gap, a first and second electrode for causing an electric field within the gap and a liquid crystal composition in the gap, comprising mobile ions. The liquid crystal composition is selected to exhibit fluid turbulence due to movement of the mobile ions in response to the electric field. The fluid turbulence in the liquid crystal results in time varying spatially random multiple scattering of light transmitted through the liquid crystal composition.

According to a second aspect, there is provided a device for speckle reduction, comprising an optical cell and a controller, wherein:
  the optical cell comprises a first and second cell wall spaced apart by a gap, and a liquid crystal composition in the gap;
  the controller is configured to cause fluid turbulence in the liquid crystal composition;
  wherein the fluid turbulence in the liquid crystal results in time varying spatially random scattering of light transmitted through the liquid crystal composition.

The optical cell may comprise a first and second electrode for causing an electric field within the gap; and a liquid crystal composition in the gap comprising mobile ions.

Further electrodes may be provided for causing an electric field within the gap. In some embodiments, interdigitated electrodes are disposed on at least one of the first and second cell wall for causing (or contributing to) a field in the gap. An array of such electrodes may be used to apply an electric field between the elements of the array.

The controller may be configured to apply a voltage between the first and second electrodes to cause an electric field that results in fluid turbulence in the liquid crystal composition due to movement of the mobile ions in response to the electric field.

The controller may be a fluid pump that is configured to cause fluid turbulence in the liquid crystal composition by pumping the liquid crystal composition. The fluid pump may be a piezoelectric fluid pump, for example comprising a diaphragm actuated by a piezoelectric material.

At least one of the first and second cell wall may be optically transmissive. At least one of the first and second cell wall may be at least partially reflective. In embodiments with transmissive first and second cell walls, light may pass through the first cell wall, through the liquid crystal composition, and through the second cell wall. In embodiments with a reflective cell wall and a transmissive cell wall, light may pass through the transmissive cell wall, through the liquid crystal composition, and then reflect off the reflective cell wall to pass back through the liquid crystal composition and transmissive cell wall. This double pass through the liquid crystal composition may enhance scattering.

The liquid crystal composition may have anisotropic electrical conductivity. For example, in the case of a nematic liquid crystal or a chiral nematic liquid crystal the conductivity may be greater parallel to the director than perpendicular to the director. This means that mobile ions can flow more easily along the director than perpendicular to it. Redistribution of charge caused by the movement of the mobile ions may set up new components of the electric field that impose a torque on the local director, resulting in local instabilities in the director profile, causing fluid turbulence.

The fluid turbulence may result from electrohydrodynamic instability in the liquid crystal composition.

The liquid crystal composition may comprise a dopant to enhance ionic concentration and reduce the electric field required for fluid turbulence (or electrohydrodynamic instability).

The dopant may comprise at least one of: an ionic dopant, an electron donor, or an electron acceptor.

The dopant may comprise cetyltrimethylammonium bromide, CTAB.

CTAB may be is present in the liquid crystal composition at a concentration of between 0.05 and 0.2% by weight.

The liquid crystal composition may have positive dielectric anisotropy. The liquid crystal composition may have negative dielectric anisotropy, or may have isotropic dielectric properties.

The liquid crystal composition may have a chiral nematic phase. References to a phase in this disclosure may mean a phase at standard temperature and pressure conditions of 20° C. and 101.325 kPa.

The liquid crystal composition may comprise a chiral dopant to induce chirality.

The liquid crystal composition may be inherently ionic.

The liquid crystal composition may comprise at least one of: a smectic A phase; a blue phase; an achiral nematic phase.

The controller may be configured to apply a time varying electric field.

The controller may be configured to apply a time varying voltage to the first and second electrode. This time varying voltage may be in the form of a square wave. Where there are additional electrodes, the controller may be configured to apply voltages between the electrodes to cause an appropriate field in the gap.

The frequency of the time varying electric field may be less than 1 kHz. The frequency of the time varying electric field may be between 50 Hz and 500 Hz.

The first and second cell wall may be substantially parallel. The gap between the first and second cell wall may be between 2 μm and 50 μm or 2 μm to 1 mm.

The first and/or second cell wall may have a structured surface adjacent to the liquid crystal composition. The structured surface may be a patterned or etched surface.

The device may additionally comprise a static diffuser. The static diffuser may be ground glass or may comprise a polymer. The static diffuser may be a portion of the first and/or second cell wall. The static diffuser may be separate from the first and/or second cell wall.

The first electrode may be disposed on the first cell wall, and the second electrode may be disposed on the second cell wall. Alternatively, first and second electrode may be disposed on the first cell wall, in a lateral electrode configuration. There may be multiple first electrodes and/or multiple second electrodes.

The first and second electrode may comprise a transparent conductive material, such as transparent conductive oxide or a transparent conducting polymer. Any suitable material can be used, e.g. ITO, IGZO, ZnO etc.

Alternatively, the first and second electrode may comprise a transparent conductive polymeric material, or the first and second electrode may comprise graphene.

The device may be used in a reflective configuration. The first or second cell wall may additionally comprise a reflective element. The reflective element may be the first or second electrode. The reflective first or second electrode may be silver, aluminium or gold.

The liquid crystal composition may comprise nanoparticles or microparticles to increase scattering. The nanoparticles or microparticles may have a different refractive index to the bulk liquid crystal composition. The refractive index of the nanoparticles or microparticles may be higher or lower than the bulk liquid crystal composition. The nanoparticles or microparticles may be opaque. The nanoparticles may comprise titanium dioxide. A nanoparticle may be defined as a particle with a volume equivalent median diameter of less than 1 μm. A microparticle may be defined as a particle with a volume equivalent median diameter of less than 1 mm.

The liquid crystal combination may comprise localised polymer networks to increase scattering.

The liquid crystal composition may comprise a viscosity reducing agent. The liquid crystal composition may comprise a redox dopant to improve lifetime of the liquid crystal composition.

The liquid crystal composition may comprise a chiral nematic phase with a pitch of 200 nm to 400 nm or a pitch of 50 nm to 1000 nm. The liquid crystal composition may comprise a chiral nematic phase with a pitch of 200 nm to 600 nm. The liquid crystal composition may comprise a liquid crystal with a pitch of less than 600 nm, or less than 400 nm, or less than 200 nm.

At least one of the first and second cell walls may comprise an anti-reflective coating.

The device may comprise a plurality of cells. The cells may be driven from the same controller. Static diffusers may be interspersed between the cells.

The device may comprise a temperature controlled mount/stage for the optical cell for controlling the operating temperature of the optical cell.

The device may further comprise a controller configured to operate the temperature controlled mount/stage to keep the liquid crystal composition at an operating temperature (or range of operating temperatures). The operating temperature (or range of operating temperatures) may be nearer to an upper transition temperature of the chiral nematic phase than a lower transition temperature of the chiral nematic phase.

According to a third aspect, there is provided a display projection system, comprising a coherent light source and the cell or device according to the first or second aspect, the cell or device configured to reduce speckle contrast in an image projected by the system.

According to a fourth aspect, there is provided a method of speckle reduction, comprising: transmitting a coherent light beam through a liquid crystal composition in a liquid crystal cell; causing fluid turbulence in the liquid crystal composition, the fluid turbulence causing dynamic scattering of the coherent light beam.

The method may comprise transmitting the beam of light through the liquid crystal cell. Where the liquid crystal cell comprises reflective cell wall, the method may comprise transmitting a beam of light through at least part of a liquid crystal cell.

Causing fluid turbulence may comprise applying an electric field to the liquid crystal composition. Applying an electric field to the liquid crystal composition may comprise causing electrohydrodynamic instability in the liquid crystal composition due to movement of mobile ions in the liquid crystal composition.

Causing fluid turbulence may comprise pumping the liquid crystal composition.

The method may comprise using a cell or device according to either of the first or second aspect to reduce speckle.

Applying an electric field may comprise applying a voltage between a first and second electrode of the liquid crystal cell.

Applying an electric field may comprise applying a time varying voltage between the first and second electrode.

The time varying voltage may have a frequency of between 50 Hz and 500 Hz. The applied field may be less than 20V/μm. The applied voltage may be less than 300V.

Each and every feature of each aspect may be combined with each and every feature of each other aspect, as appropriate. For example, features described with reference to a device may be included in the cell, and also in the method. A device or cell may be configured to perform a feature described with reference to a method, and a method may use a device or cell including any features described herein.

Embodiments of the invention will now be described, purely by way of example, with reference to the accompanying drawings, in which.

Figure 1:
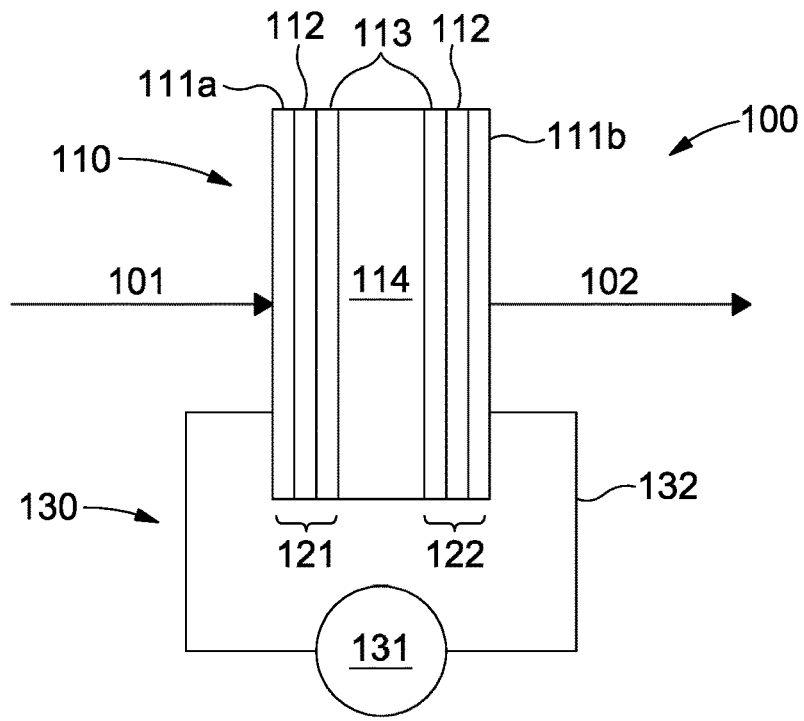
FIG. 1 is a schematic diagram of a device according to an embodiment comprising a transmissive cell.

Referring to FIG. 1, a device 100 for speckle reduction is shown, comprising a LC cell 110 and controller 130. The LC cell 110 comprises a first cell wall 121 and second cell wall 122, spaced apart by a gap. The first and second cell wall 121, 122 respectively comprise a first and second electrode 111a, 111b for applying an electric field in the gap. In this embodiment the electric field is applied perpendicular to the first and second wall, but other embodiments may comprise a lateral electrode arrangement, so that the field is applied parallel to the first wall 121 or second wall 122. In some embodiments the first and second electrode may both be disposed on the first wall, or on the second wall. These electrodes may be in an in-plane configuration in which the two opposite polarity electrodes are interdigitated within the same plane.

In some embodiments the first and second electrode 111a, 111b may configured to contact the liquid crystal disposed in the gap 114, to inject charge into the liquid crystal composition. The injected charge may result in an increased density of charge carriers or an increased average charge on mobile ions or molecules. The injection of charge may therefore enhance scattering and/or reduce the electrical field required to cause electrohydrodynamic instability in the LC composition. In some embodiments at least one further electrode may be provided for charge injection, independent of the electrodes controlling the electrical field in the gap (which may not be in contact with the liquid crystal).

The first and second cell wall 121, 122 are preferably planar and substantially parallel, but other arrangements may also be used. The first and second cell wall 121, 122 are both preferably substantially transparent at a wavelength of interest, and are at least transmissive at the wavelength of interest. Each of the first and second cell wall 121, 122 may comprise an electrode comprising substantially transparent electrically conductive material 111a, 111b (e.g. Indium Tin Oxide, ITO), disposed on a substantially transparent support layer 112 which may be non-conducting (e.g. glass). An alignment layer 113 (e.g. an anti-parallel rubbed polyimide layer) may optionally be provided on the interior faces of the first and second cell walls 121, 122, but this is not essential.

A LC composition 114 is disposed in the gap between the first and second cell walls 121, 122. The LC composition 114 is conductive and comprises mobile ions.

The controller 130 is configured to apply a voltage between the first and second electrodes (associated with the first and second walls respectively), so as to cause an electric field in the gap. The electric field is sufficient to cause a dynamic scattering state in the LC composition 114 due to electrohydrodynamic instability in the LC composition 114 resulting from movement of the mobile ions in response to the electric field. The movement of the mobile ions results in a spatial distribution of charge that imposes a torque on the LC molecules. The controller 130 is preferably configured to alternate the polarity of the electric field, to prevent build-up of the mobile ions adjacent to one of the first or second walls 121, 122. The frequency of alternation may be from 50 Hz to 1 kHz, or from 100 Hz to 500 Hz. Speckle in a projected image formed using the coherent light beam 101 is reduced by passing the coherent light beam 101 through the cell 110, to produce a scattered light beam 102.

Figure 2:
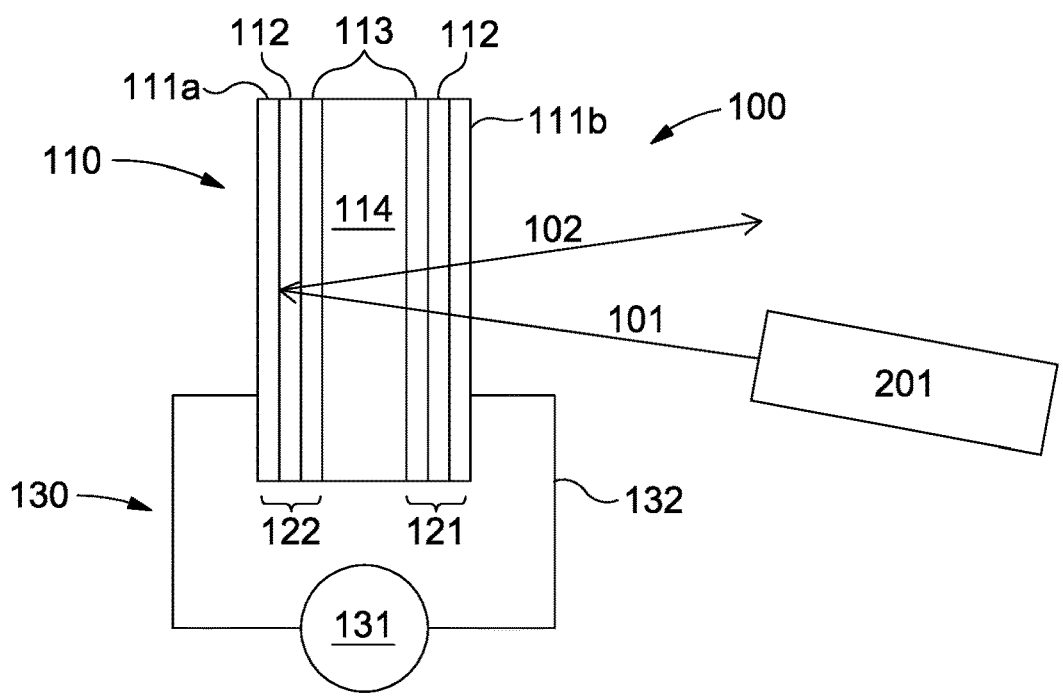
FIG. 2 is a schematic diagram of a device according to an embodiment comprising a reflective cell wall.

FIG. 2 shows an alternative embodiment, which includes all the features of FIG. 1, with the exception that the first electrode 111a in the embodiment of FIG. 2 is at least partially reflective (e.g. comprising gold, aluminium etc), and the cell 110 is configured to operate in a reflective mode in which a coherent light beam 101 is reflected by the cell 110 as a scattered light beam 102. This double pass through the LC composition may enhance scattering and facilitate a reduced gap (which in turn may reduce the voltage required to set up the necessary field).

Figure 3:
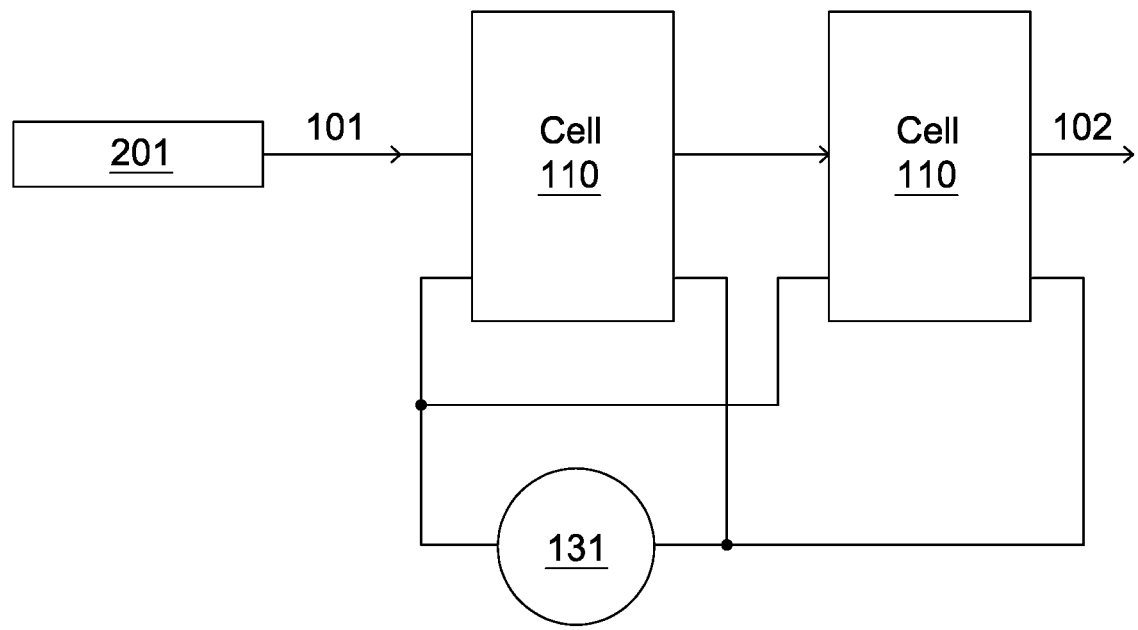
FIG. 3 is a schematic diagram of a device according to an embodiment comprising two cells arranged in series.

FIG. 3 illustrates a further embodiment in which a first and second transmissive cell 110 are arranged in series, to produce a scattered light beam 102 from the interaction of a coherent light beam 101 from a light source 201 (e.g. a laser) with the first and second transmissive cell 110. Arrangements with a plurality of cells 110 may be used to enhance scattering of the coherent beam, or to reduce the required voltage for a given degree of scattering (by reducing the gap in each cell, which may increase the applied field for a given voltage). The controller 131 in this example is configured to apply the same voltage difference between the electrodes of the first and second cells. This will produce the same field, should the first and second cells be of identical construction, which is not essential. In some configurations, one or more transmission mode cells 110 may be combined with a reflection mode cell 110.

Figure 4:
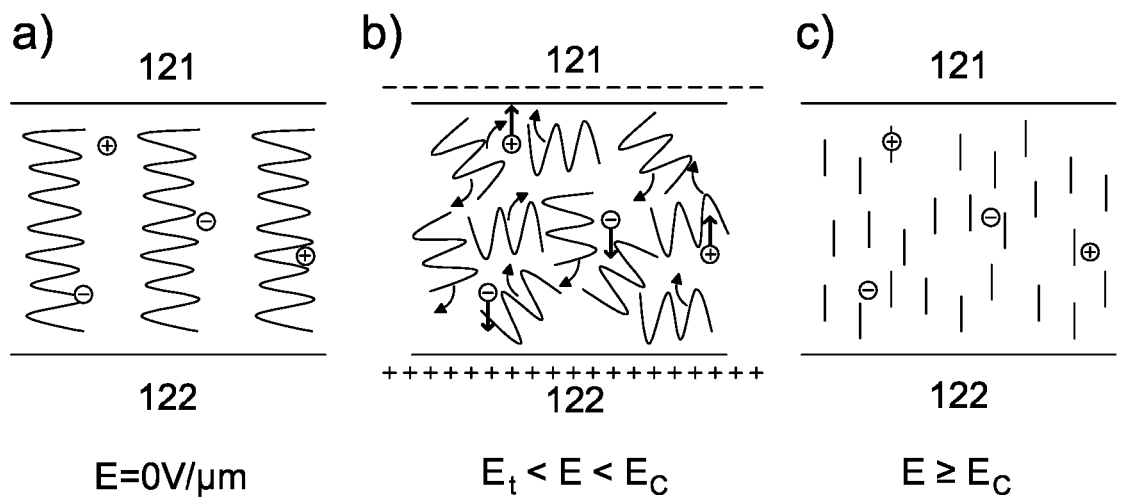
FIG. 4 illustrates the mechanism of operation of a device according to an embodiment.

This mechanism is illustrated in FIG. 4, with reference to a chiral (right-handed) nematic LC composition with positive dielectric anisotropy. With no electrical field a), the LC composition is in a chiral nematic state, with the helical axes normal to the plane of the first and second cell walls 121, 122.

When a sufficient electric field ($E>E_t$) is produced b) between the first and second cell walls 121, 122 by applying a voltage between the first and second electrodes of the first and second cell walls 121, 122, movement of the mobile ions leads to dynamic disruption of the chiral nematic phase of the LC composition. This disruption is dynamic due to the turbulence induced in the LC material caused by redistribution of the mobile ions in response to the field. This is different to prior art approaches to speckle reduction using LC cells, which rely either on complex time varying electrical fields, or which toggle rapidly between a number of fixed stable LC phases to achieve speckle reduction. In embodiments of the present invention, the dynamic scattering is caused by the movement of mobile ions in response to an applied field, which disrupts the orientation of the LC molecules.

The amount of applied field required to achieve dynamic scattering due to charge redistribution in the liquid crystal depends on the specifics of the LC composition (and for embodiments that employ charge injection, may also depend on the electrode properties), In general, more conductive LC compositions (with relatively high ion mobility, and/or with a relatively high concentration of ions) tend to be dynamically excited with a reduced electric field. In some embodiments, the conductivity of the LC composition may be enhanced by addition of a dopant, and in other embodiments the LC molecules may themselves be inherently ionic. Where a dopant is used to enhance conduction, the dopant may be inherently ionic, or may give rise to ions in the LC composition by accepting or donating electrons. A LC composition with low conductivity may still be operable in accordance with an embodiment, but with an increased electrical field (which may have cost implications).

Where the applied electric field is parallel with the quiescent (no field) orientation of the chiral nematic phase, positive dielectric anisotropy of the LC composition may assist in disrupting the orientation of the quiescent chiral nematic phase into a dynamic focal conic phase, in which micro-helices of chiral nematic LC material move turbulently due to electrohydrodynamic instability. In cells configured to provide an electric field perpendicular to the quiescent orientation of the chiral nematic phase, negative dielectric anisotropy may assist in disrupting the orientation of the chiral nematic phase.

At higher applied field c), above a critical field $E_C$, the LC material may transition to a nematic phase, in which the molecules of LC material are orientated parallel with the applied electric field. This static state will not dynamically scatter to disrupt speckle.

Figure 5:
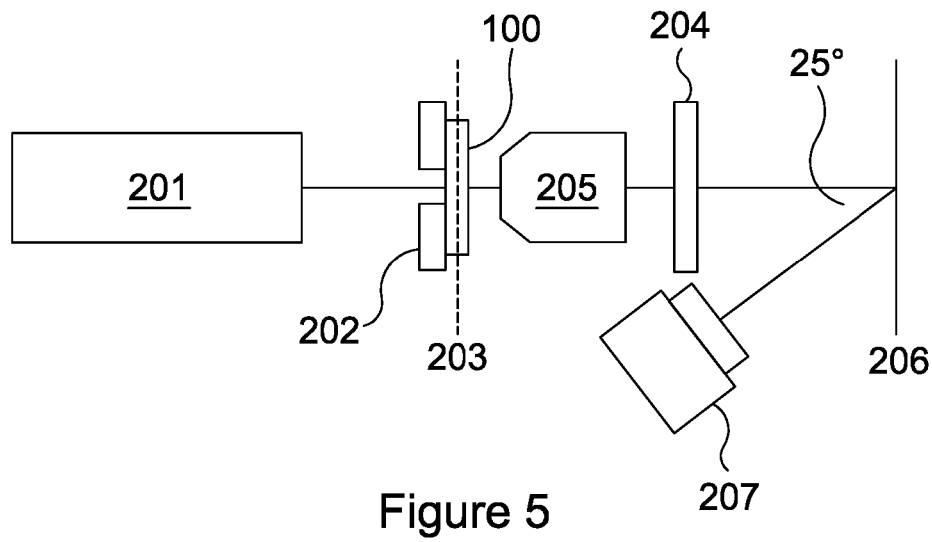
FIG. 5 is a diagram of a test arrangement for evaluating speckle reduction.

To measure the speckle contrast C, a Helium-Neon (He—Ne) LASER (JDS Uniphase 1122P, $\lambda=633$ nm) was used as the coherent light source 201, as shown in a diagram of the experimental apparatus in FIG. 5. A microscope objective 205 collects light transmitted through the cell and a CCD camera 207 operating in the linear regime then captures an image of the resulting spot that is projected onto the projection screen 206. In the captured image, a selection of 200×200 pixels from the centre of the beam are then analysed to calculate C. A combination of signal generator and amplifier were used to apply a square wave ac electric field across the cell electrodes under test. The CCD 207 and signal generator were both computer controlled to ensure accurate timing of the electric field condition and image acquisition.

A range of neutral density filers 204 were used to maintain a near-constant mean intensity in each image. Histograms for every image recorded were checked to ensure no over- or under-exposure of the light occurred. A temperature controlled stage 202 was used to ensure a constant operating temperature for the LC cell throughout each measurement reported herein. Normal white printing paper was used as a projection screen 206 and the CCD 207 was placed at a distance of 160 mm from the screen 206 at an angle of 25°. A monochrome CCD was selected to maximise resolution as the Bayer filter layout used in colour CCDs renders up to 75% of the sensors obsolete when imaging monochromatic light.

Speckle measurements vary considerably with different experimental set-ups, making it somewhat difficult to compare directly the reported speckle contrast values. Nevertheless, a number of factors may be significant. These include 1) ensuring ambient lighting is less than the least significant bit of the dynamic range; 2) a minimal camera bit-depth of 6; 3) a ratio of pixel area to minimum speckle grain area of at least 3.5; and 4) a ratio of maximum speckle intensity to camera saturation of 0.3-1.0. All of these conditions were satisfied in the experimental set-up used to illustrate embodiments.

With applications such as imaging and holographic projection in mind, conditions were chosen to observe speckle in a way that closely matches 'human perception'. A 3.2 mm iris in front of the CCD sensor 207 was used to match the average pupil size under similar lighting conditions. The integration time of the camera was set to 50 ms (with a range of exposure times also reported), which corresponds to the temporal integration time of the eye. The focussing lens used with the camera (focal length=33 mm) was selected to spatially sample incoming light with a camera pixel density equal to the density of cones in the eye, which corresponds to a pixel-speckle ratio of 3.5 as required above.

The cell walls 121, 122 used in all example embodiments described herein comprised two indium tin oxide-coated glass substrates with antiparallel rubbed polyimide alignment layers. In all cases, the gap between the cell walls 121, 122 was defined by the 20 µm diameter spacer beads that were dispersed throughout the cell. After the mixtures had been prepared, each cell was filled by capillary action at a temperature of T=80° C., before allowing them to cool to room temperature.

In other embodiments, an alternative material (that is substantially transmissive at the wavelength of interest) may be used for the cell walls, such as a polymeric material (e.g. polycarbonate). Any suitable electrode material may similarly be used, for example any transparent conducting oxide (ZnO, IGZO etc). Although spacer beads are a convenient way of spacing the cell walls apart, in other embodiments an alternative arrangement may be used. For example, the first and second cell walls may be portions of a monolithic cell arrangement. The spacer beads may be opaque to improve the scattering.

The alignment layer 113 may alternatively be a structured surface to disrupt the alignment of the liquid crystal molecules. This structured surface may be a patterned or etched glass, metal or polymer. The device may optionally incorporate a static diffuser to enhance the scattering. This static diffuser may be glass or polymer-based. The static diffuser may be incorporated into the cell walls or be external to the cell.

The experimental results shown in FIGS. 6 to 10 were obtained for a first example device according to an embodiment. In the first example embodiment the chiral nematic LC composition 114 consisted of the wide temperature range nematic LC, BL006 premixed with chiral dopant R5011. This mixture formed a chiral nematic LC phase at room temperature with a right-handed helical structure, which was confirmed using optical polarizing microscopy. At a temperature of 25° C. the pitch was found to be 250 nm. A frequency of f=160 Hz was used in all experiments reported in FIGS. 6 to 10.

Although the first example LC composition is a chiral nematic LC composition, it is not essential that the composition should have a chiral nematic phase and any suitable LC composition may be used. For example, in other embodiments the LC composition may be nematic (non-chiral). In some embodiments the LC composition may have a Smectic A phase, or a blue phase.

The first example LC composition exhibits positive dielectric anisotropy, but this is not essential, and an LC composition with isotropic dielectric properties may be used, or a composition with negative dielectric anisotropy.

To enhance the conductivity properties of the mixture, an ionic species in the form of cetyltrimethylammonium bromide (CTAB) was added to the first example LC composition in selected cells at a concentration of 0.1 wt. %. To a first approximation, the conductivity of an isotropic liquid is determined by the ionic charge, the ionic concentration, and the mobility. By dispersing an ionic dopant (e.g. CTAB) into the host mixture, the ionic charge and the concentration are both increased, which in turn reduces the electric field amplitude required to induce electrohydrodynamic instability. In other embodiments an inherently ionic LC material may be used, or a different dopant may be added. Examples of inherently ionic dopants include: cetyltrimethylammonium bromide (CTAB), tetrabutylammonium picrate (TBAP), tetrabutylammonium bromide (TBAB), dodecyltrimethylammonium bromide (DTAB). Examples of acceptor dopants include tetracyanoethylene (TCE), tetracyanoquinodimethane (TCQM), and 2,3-dichloro-5,6-dicyanobenzoquinone (DCDCBQ). An example of a donor dopant is p-phenylenediamine (FDA). Other dopants can be used, and mixtures of different dopants are also envisaged.

Figure 6:
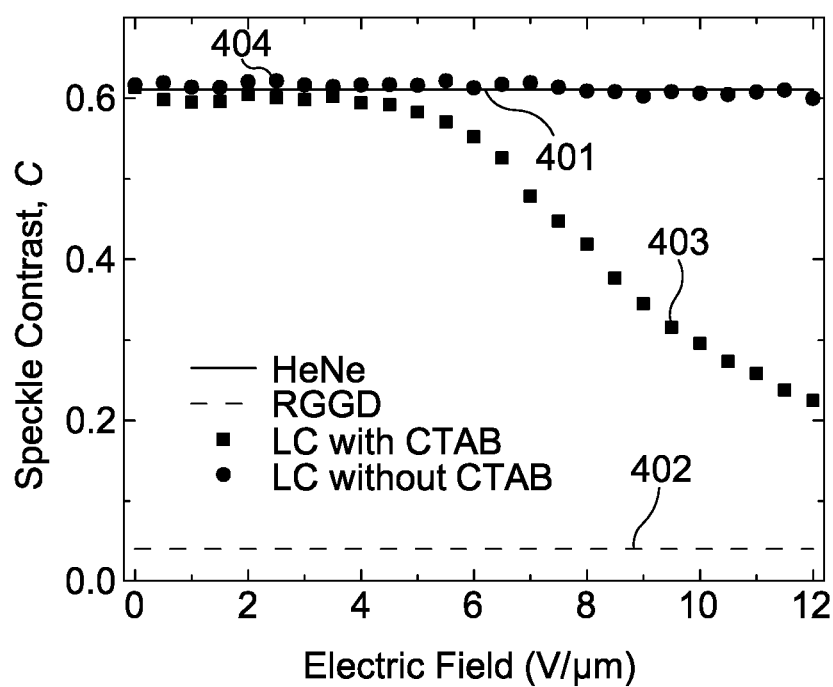
FIG. 6 is a plot of a speckle contrast parameter C as a function of field amplitude E for a first example embodiment at 25° C., comparing the parameter C obtained according to an embodiment with those for a rotating ground glass diffuser and for no speckle reduction device.
Figure 7:
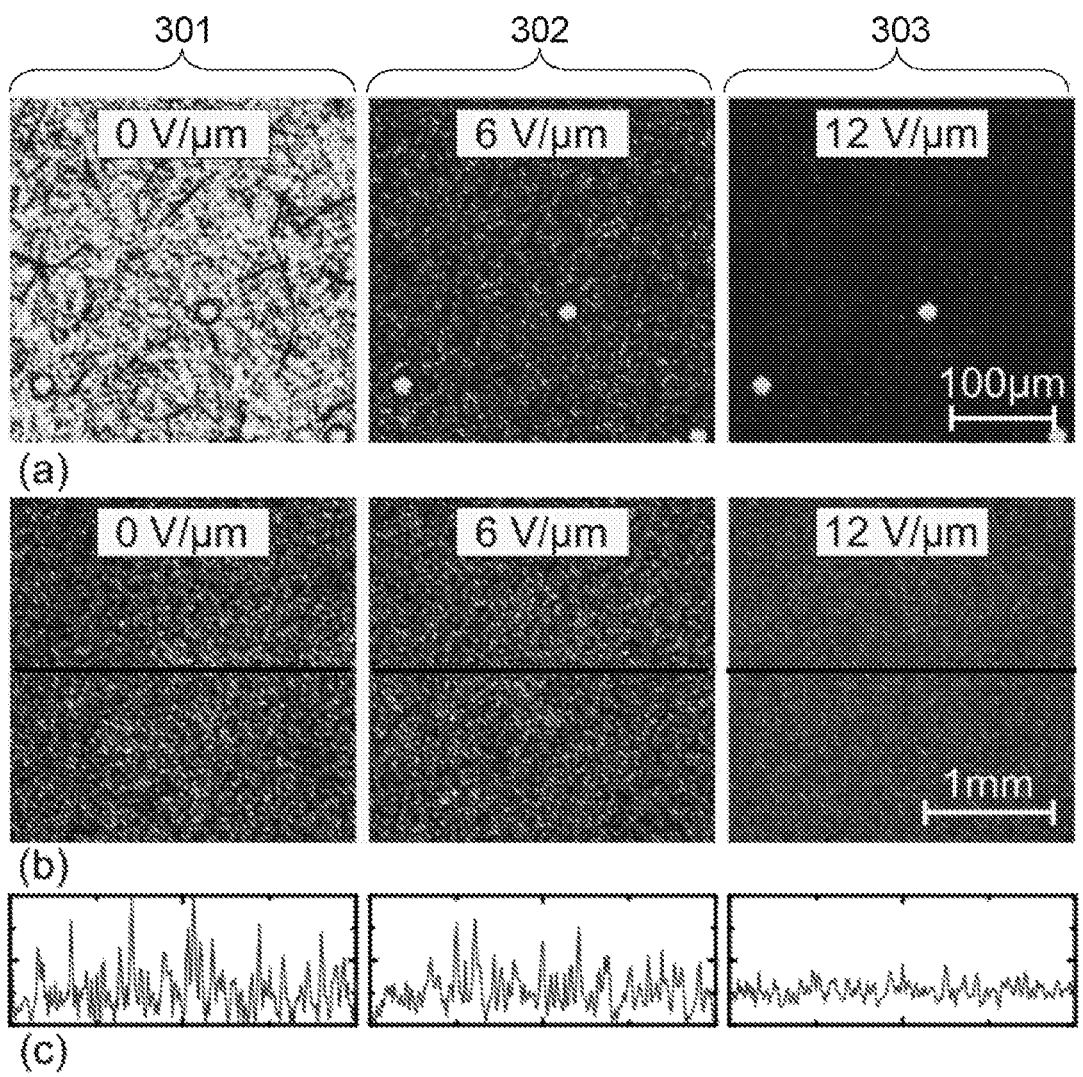
FIG. 7 is a) microscope images of a cell according to a first example embodiment at 25° C. at different applied electrical fields, b) corresponding images of the speckle pattern recorded by the LCD in the test arrangement, c) plots of intensity along a central line of pixels across the width of the images.

FIG. 6 presents measurements of speckle contrast C as a function of the applied electric field amplitude at 25° C. for various conditions. A baseline value 401 of contrast C with no LC material is shown, along with a value of contrast C for a rotating ground glass disk (RGGD) 402. The rotating ground glass diffuser gave a value of C=0.04, in good agreement with previously published results for similar devices. The speckle contrast parameter for the He—Ne alone was found to be 0.611±0.008, close to the theoretical value of $1/\sqrt{2}$.

Also shown in FIG. 6 are results from a cell according to an embodiment comprising the first example chiral nematic LC mixture with an ionic dopant 403 and without an ionic dopant 404. For the range of electric field amplitudes considered here (up to 12 V/µm), no dynamic scattering and consequently no reduction in C was observed with no ionic dopant, although a higher excitation voltage could be used to cause electrohydrodynamic instability and consequently dynamic scattering.

In contrast, for a device according an alternative embodiment, comprising the same first example chiral nematic LC mixture (BL006 premixed with R5011) and with the addition of an ionic dopant, (in this example CTAB), a dynamic scattering state was observed with a relatively low electric field threshold of E=4 V/μm. A further increase in the electric field strength then resulted in an increase in the turbulence of the scattering state, which in turn served to reduce the magnitude of C to a value of 0.22 for E=12 V/μm. The speckle reduction was calculated as 64% for the example embodiment with ionic dopant at 12 V/μm. Notably, some embodiments enable control over the amount of reduction of speckle contrast C by varying the applied field E.

FIG. 7a shows microscope images of the CTAB-doped first chiral nematic example LC cell at 25° C. taken between uncrossed polarisers with: E=0V/μm 301; E=6V/μm 302; and E=12V/μm 303. At E=0V/μm there is no observable turbulence in the cell, but above E=4V/μm dynamic scattering is observed, which increases with increasing electric field. The dynamic scattering in the first example LC composition 114 results in a marked drop in transmission to almost 13% at E=12V/μm. (In comparison, the RGGD was found to have a transmission of 33%.) Three 20 μm spacer beads are also present in each image. FIG. 7b shows the 200×200 pixel, monochrome images of the speckle pattern that were recorded for three different magnitudes of the applied electric field. The mean intensity of each image has been normalised in order to allow for a direct comparison. A plot of pixel intensities through the central line of the image is provided in FIG. 7c, where it can be seen that the contrast between the light and dark regions in the granular pattern has been significantly reduced due to dynamic scattering in the LC.

Figure 8:
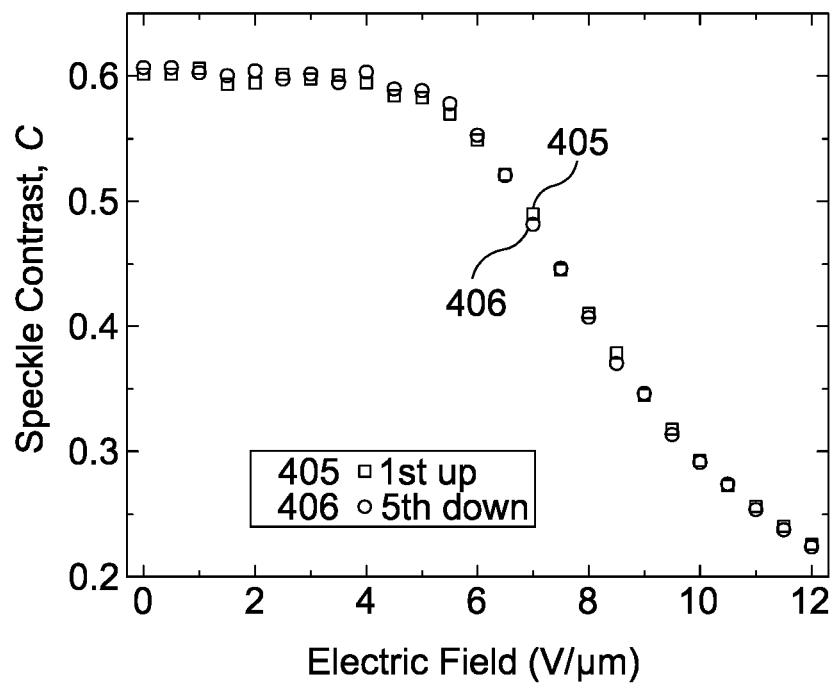
FIG. 8 is a plot of speckle contrast C, as a function of electrical field E, at 25° C., for a first example embodiment.

FIG. 8 presents results of speckle contrast C as a function of the applied electric field at 25° C. upon increasing and decreasing the amplitude for five consecutive cycles, with the electric field being held constant for 2 s at each level. The results for the first cycle up 405 are substantially identical to the results of the fifth cycle down 406. In this example, the electric field was increased from E=0 V/μm to E=12 V/μm and subsequently decreased back to E=0 V/μm in increments of 0.1 V/μm. Clearly, there is little in the way of hysteresis between the first and the fifth cycle.

In addition, a study was performed of the speckle contrast dependency on frequency of the applied electric field at 25° C. It was found that C varies very little over a range of f=150-450 Hz, irrespective of E-field amplitude. A speckle contrast as low as 0.214 was achieved with E=12 V/μm and f=275 Hz. With a sufficiently high frequency (approximately >20 kHz at 12V/μm, 25° C.), dynamic scattering disappears as a result of the transition from the 'conductive' regime, in which charge redistribution results in dynamic scattering, to a regime that is substantially dielectric (without sufficient charge redistribution over each cycle to cause dynamic scattering). At frequencies below 150 Hz, speckle contrast is again increased. This may be due to the ion transport time being shorter than the time period between the reversals in the polarity of the E-field, resulting in accumulation of charge.

Figure 9:
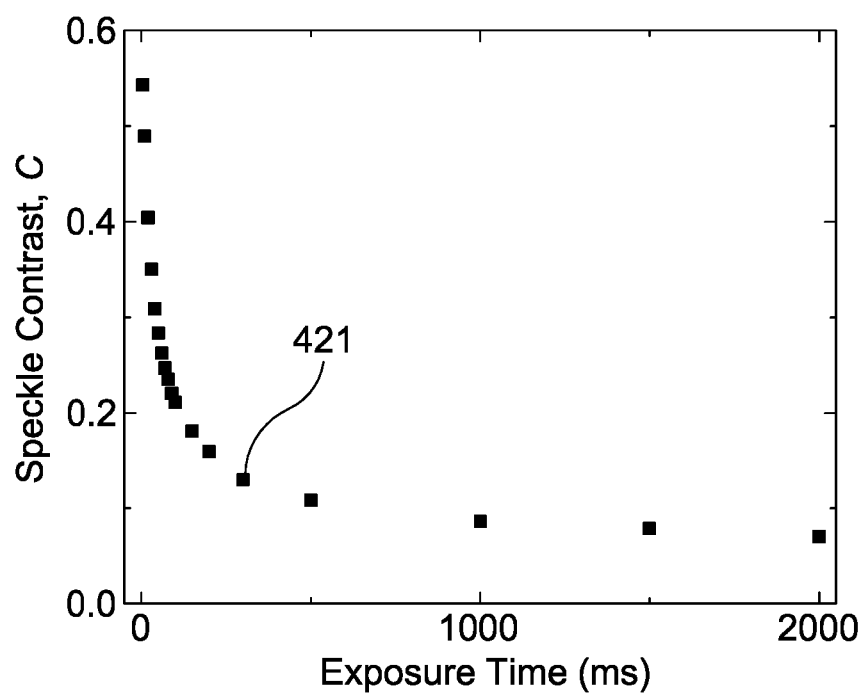
FIG. 9 is a plot of speckle contrast C, as a function of camera exposure time for a first example embodiment at 25° C., with E=10V/μm.

FIG. 9 illustrates the speckle contrast 421 observed for the CTAB-doped first example cell, recorded as a function of camera exposure time (with a field E=10 V/μm) at 25° C. Increasing exposure time reduces speckle contrast, as more independent speckle patterns are averaged during the integration time. These results suggest that further speckle reduction could be achieved through a faster response of the dynamic scattering process.

Figure 10:
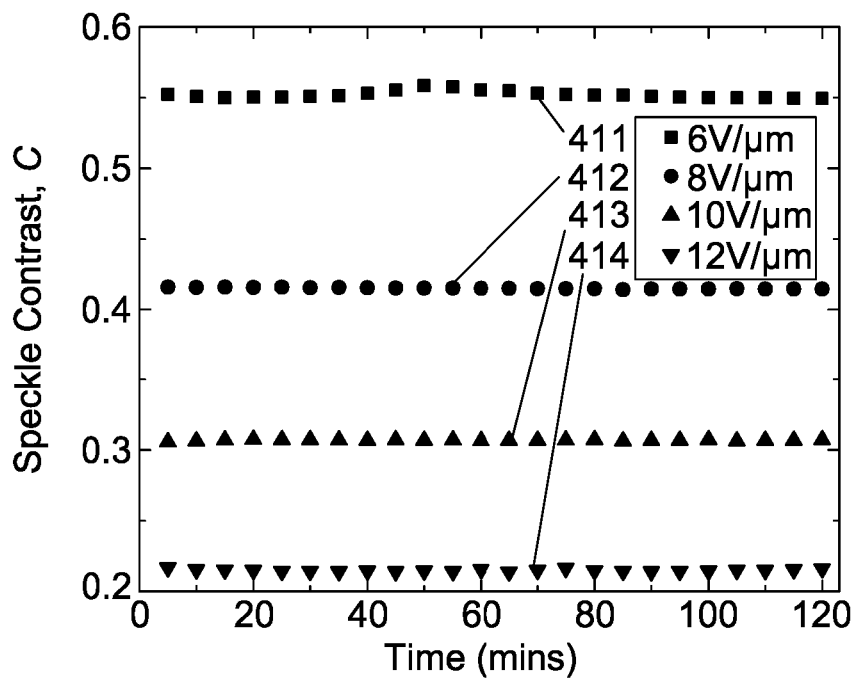
FIG. 10 is a plot of speckle contrast as a function of time at 25° C. for a first example embodiment under constant electric field conditions for 2 hour periods.

FIG. 10 shows the results of investigating repeatability and stability of an example device. The example device was tested by applying a constant E-field amplitude to a CTAB-doped first example chiral nematic LC cell at 25° C. for two-hour periods and a measurement of C was taken every 1 s. Measurements were taken over two hours for each of 6, 8, 10 and 12 V/μm. The results are respectively plotted 411, 412, 413, 414 in FIG. 10, with each data point showing the average value of C measured over a five minute period. FIG. 10 shows that the output is substantially constant over two hours for electric field amplitudes up to E=12 V/μm.

Figure 11:
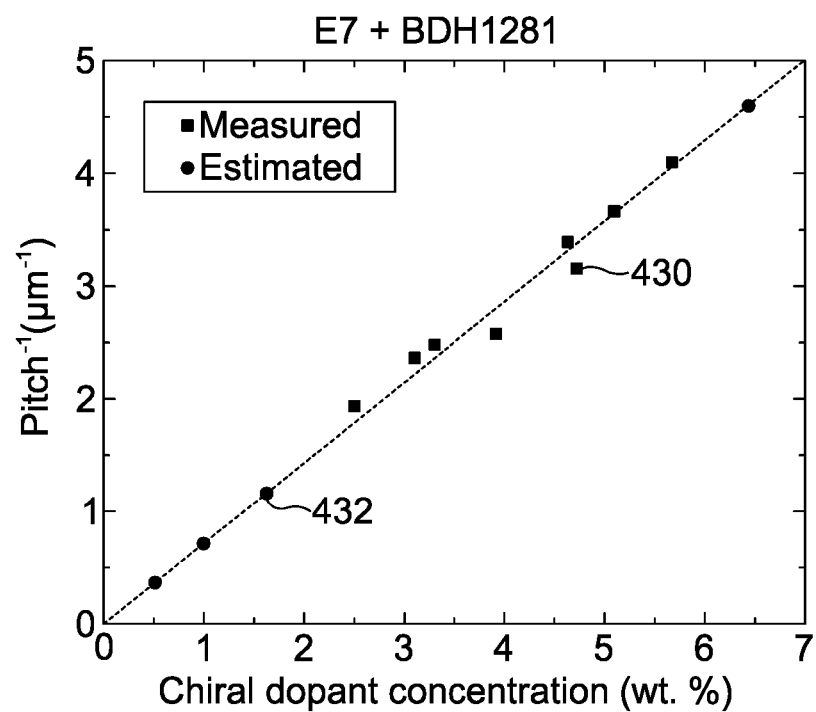
FIG. 11 is a plot of inverse chiral pitch length as a function of wt. % chiral dopant concentration for a second example embodiment.
Figure 12:
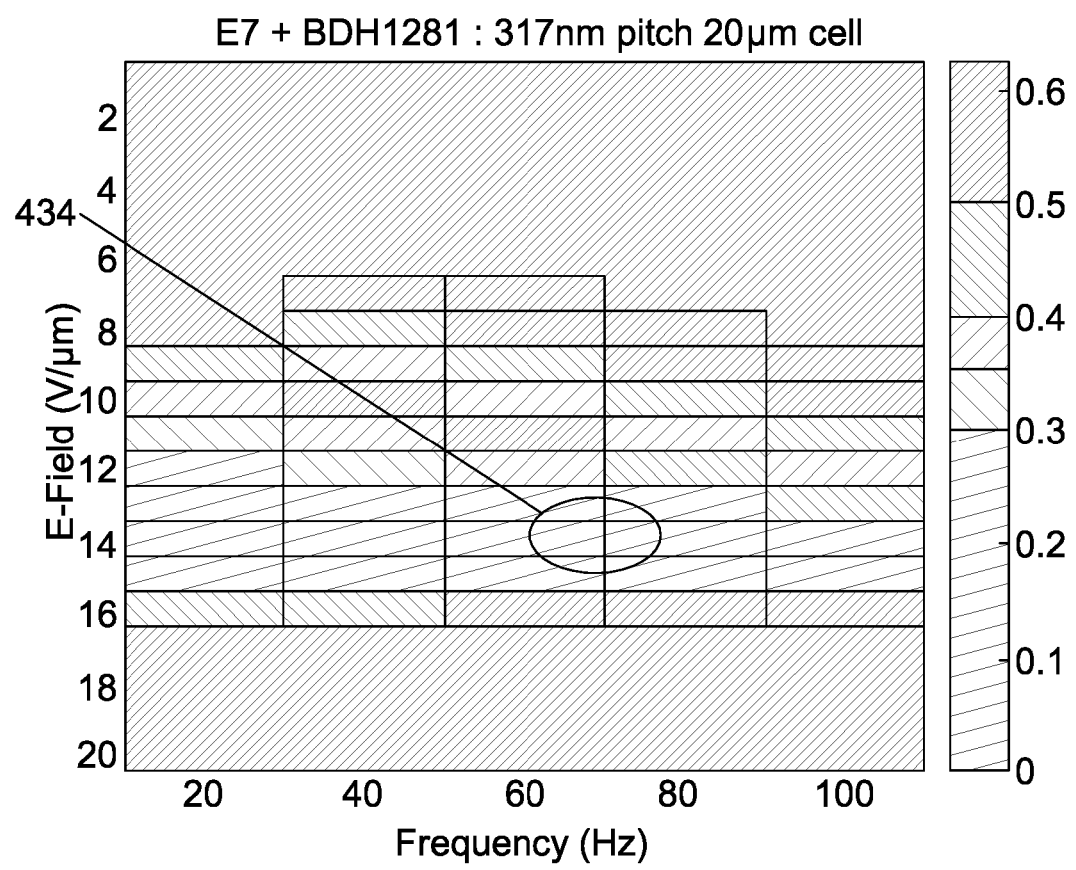
FIG. 12 is a speckle contrast map showing speckle contrast at varying applied electric field strengths and varying applied electric field frequencies for a second example embodiment at 25° C.

The experimental results shown in FIGS. 11, 12 and 13 were obtained for a second example device according to an embodiment. In this second example embodiment the chiral nematic LC composition 114 consisted of the nematic LC E7 premixed with high twisting power chiral dopant BDH1281. This mixture formed a chiral nematic LC phase at room temperature.

FIG. 11 shows a plot of reciprocal chiral pitch length as a function of wt. % concentration chiral dopant BDH1281 for the mixture of E7 with BDH1281. The reciprocal chiral pitch of the chiral nematic LC composition 114 increases linearly with increasing chiral dopant concentration. The data presented includes both measured values 430 and estimated values 432, the measured results being in agreement with theoretical predictions.

FIG. 12 shows a speckle contrast map for a chiral nematic LC composition 114 with a chiral pitch length of 317 nm. The speckle contrast map shows values of speckle contrast measured at varying applied electric field frequency (between 0 Hz and 200 Hz) and varying applied electric field strength (between 0 V/μm and 20 V/μm) at 25° C. for the chiral nematic LC composition 114. The speckle contrast map is a "heat map" where values of speckle contrast are shown using a colour gradient. Low values of speckle contrast are shown in one colour (near 0 in the legend of FIG. 12) and high values of speckle contrast are shown in another (near 0.6 in the legend of FIG. 12). A minimum in speckle contrast is seen at an applied electric field strength of 13.6 V and an applied electric field frequency of 75 Hz. This minimum speckle contrast is shown by the outlined region 434. The speckle contrast map of FIG. 12 shows the speckle contrast increasing as the applied electric field strength and applied electric field frequency values are changed away from the region of minimum speckle contrast 434.

Figure 13A:
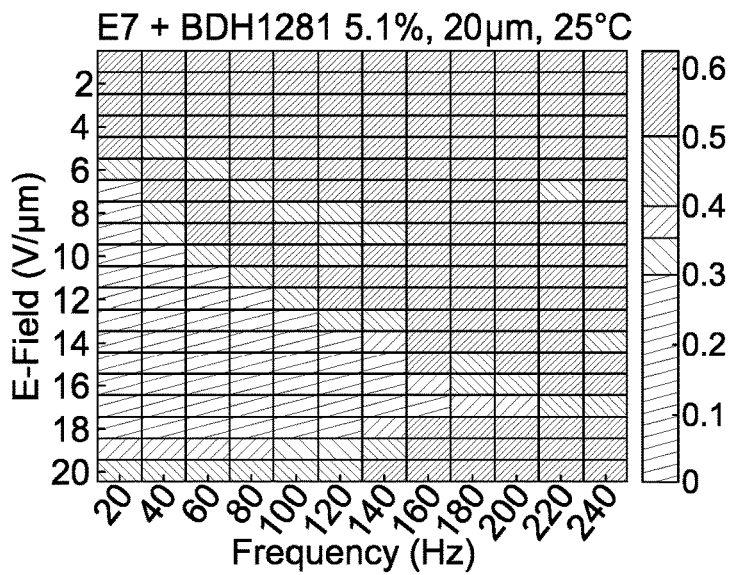
FIG. 13 (a-c) is a number of speckle contrast maps showing speckle contrast at varying applied electric field strengths and varying applied electric field frequencies for a second example embodiment at temperatures of 25° C., 40° C. and 55° C.
Figure 13B:
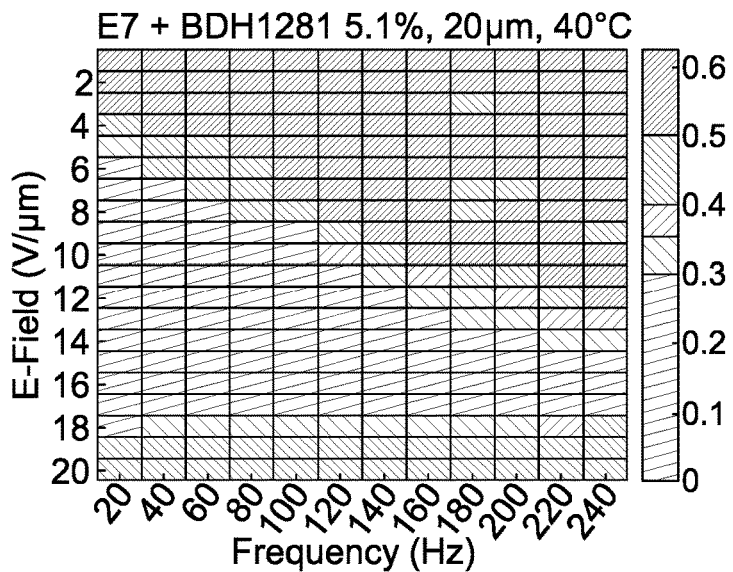
Figure 13C:
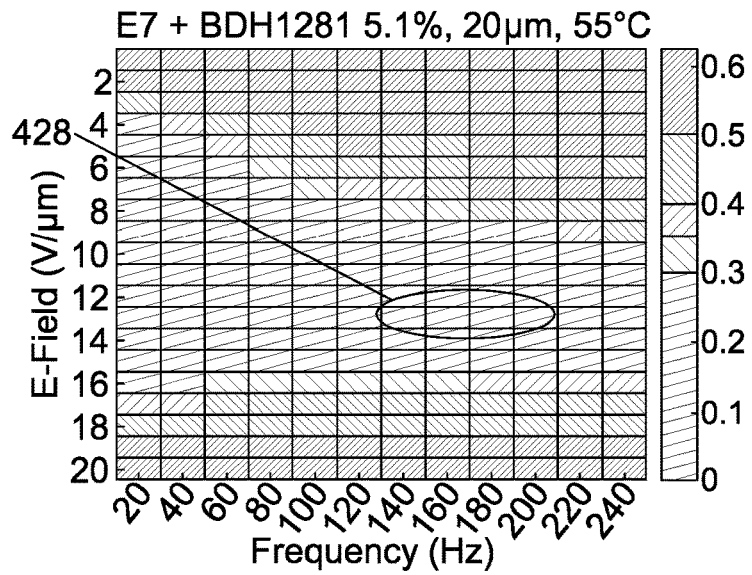

FIG. 13 shows speckle contrast maps for chiral nematic LC composition 114 with a chiral pitch length of 273 nm at temperatures of 25° C., 40° C. and 55° C. The speckle contrast map shown in FIG. 13c shows values of speckle contrast measured at varying applied electric field strength (between 0 V/μm and 20 V/μm) and varying applied electric field frequency (between 0 and 240 Hz) at 55° C. A minimum in speckle contrast is seen at an applied electric field strength of approximately 13 V/μm and an applied electric field frequency of approximately 160 Hz. This minimum speckle contrast is shown by the outlined region 428. The speckle contrast map of FIG. 13c shows the speckle contrast increasing as the applied electric field strength and applied electric field frequency values are changed away from the region of minimum speckle contrast 428. The trend across the speckle contrast maps of FIGS. 13a to 13c shows that the range of applied electric field strengths and applied electric field frequencies where a low value of speckle contrast (comparable to the minimum speckle contrast) is observed is much broader for the sample trialled at 55° C. (FIG. 13c) than for the sample trialled at 25° C. (FIG. 1a). This indicates that a speckle reduction device 100 operated at a higher temperature may be more tolerant to variations in other operating parameters (e.g. applied electric field strength, applied electric field frequency). The minimum speckle contrast of FIG. 13c is also lower than the minimum speckle contrast shown in FIG. 13a, and achieved at a lower applied electric field strength. A lower minimum speckle contrast and a broader range of possible operating conditions indicate improved performance of speckle reduction device 100 at higher temperatures.

The experimental results shown in FIG. 14 were obtained for an example device according to the first example embodiment. In this first example embodiment the chiral nematic LC composition 114 consisted of the nematic LC BL006 premixed with chiral dopant R5011. This mixture formed a chiral nematic LC phase at room temperature.

FIG. 14 includes a number of plots 420-427 showing minimum speckle contrast and other parameters (transmission, applied electric field strength, applied electric field frequency) at minimum speckle contrast as a function of temperature for a chiral pitch length of 273 nm measured at 25° C.). Each data point corresponds with the operating conditions (frequency, and field) that give either the minimum speckle contrast at that temperature, or the minimum Figure of Merit (FOM) at that temperature. The FOM is the product of speckle contrast and transmission loss. A minimum FOM value represents peak performance of the speckle reduction device 100, where minimal speckle contrast is balanced against maximal transmission of light.

Figure 14A:
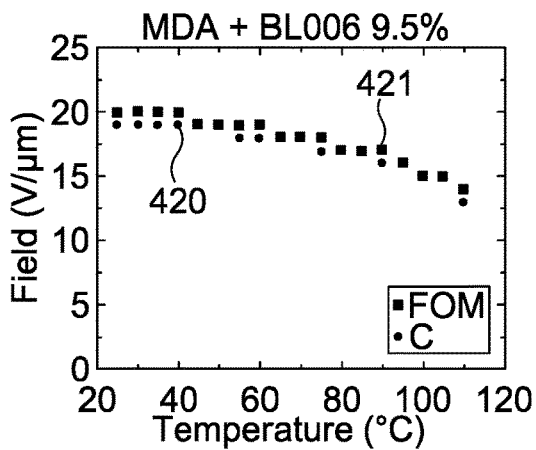
FIG. 14 (a-d) is a number of plots showing parameters (speckle contrast, transmission, applied electric field strength, applied electric field frequency) as a function of temperature for a first example embodiment.

FIG. 14a shows plot 420 of applied electric field strength required for minimum speckle contrast as a function of temperature for a chiral pitch length of 273 nm (as measured at 25° C.). Plot 420 clearly shows a negative correlation between temperature and applied electric field strength required for minimum speckle contrast. A similar trend is seen for plot 421 showing the applied electric field strength required for minimum FOM as a function of temperature.

Figure 14B:
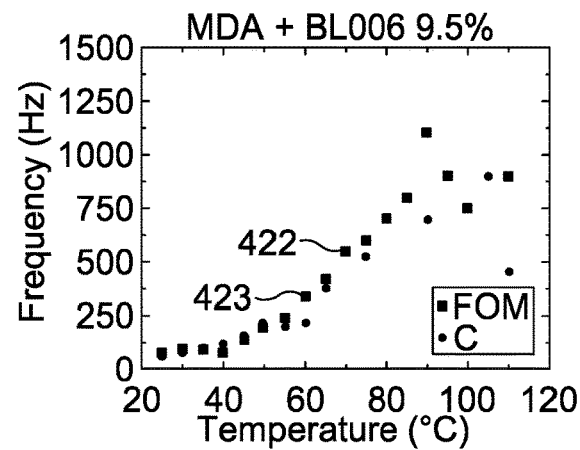

FIG. 14b shows plot 422 of applied electric field frequency required for minimum speckle contrast as a function of temperature for a chiral pitch length of 273 nm (as measured at 25° C.). Plot 422 clearly shows a positive correlation between temperature and applied electric field frequency required for minimum speckle contrast. A similar trend is seen for plot 423 showing the applied electric field frequency required for minimum FOM as a function of temperature.

Figure 14C:
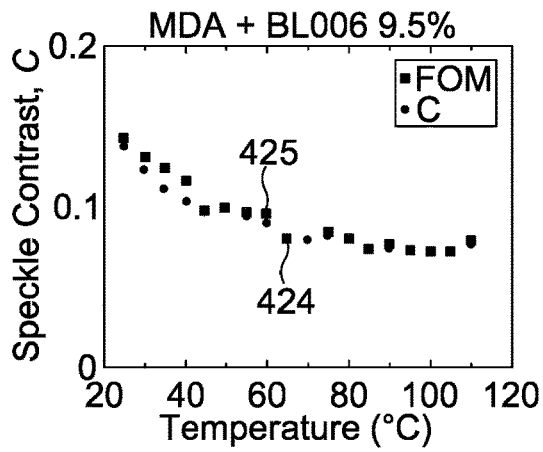

FIG. 14c shows plot 424 of minimum speckle contrast as a function of temperature for a chiral pitch length of 273 nm (as measured at 25° C.). Plot 424 shows a negative correlation between temperature and minimum speckle contrast. A similar trend is seen for plot 425 showing the minimum FOM as a function of temperature.

Figure 14D:
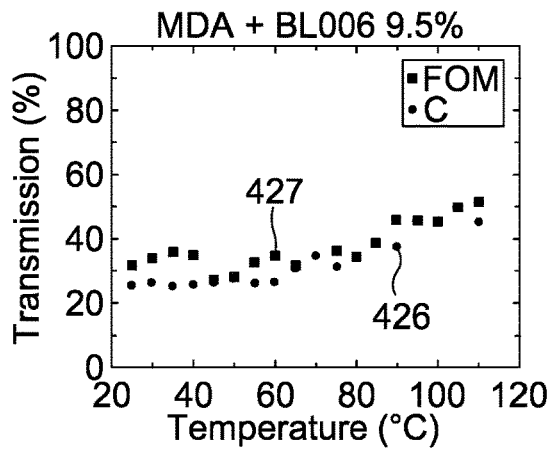

FIG. 14d shows plot 426 of percentage light transmission at minimum speckle contrast as a function of temperature for a chiral pitch length of 273 nm (as measured at 25° C.). Plot 426 clearly shows a positive correlation between temperature and transmission. A similar trend is seen for plot 427 showing the transmission at minimum FOM as a function of temperature.

The results from FIGS. 14a-d taken in context with one another indicate that increasing the temperature at which speckle reduction device 100 operates yields lower speckle contrast at lower applied electric field strengths with higher transmission. The change in properties may be due to a reduction in viscosity of the LC composition 114 with increasing temperature and/or reduced birefringence of LC composition 114 with increasing temperature. The temperature of operation of speckle reduction device 100 is therefore a parameter that may be important for improved performance. The temperature range suitable for operating speckle reduction device 100 is limited to the temperature range of the chiral nematic phase of chiral nematic LC composition 114 (i.e. the temperatures between an upper transition temperature and a lower transition temperature where composition 114 undergoes phase transformations from the chiral nematic phase). It may be optimal to choose a composition 114 with an upper transition temperature close to the operating temperature of speckle reduction device 100.

Figure 15:
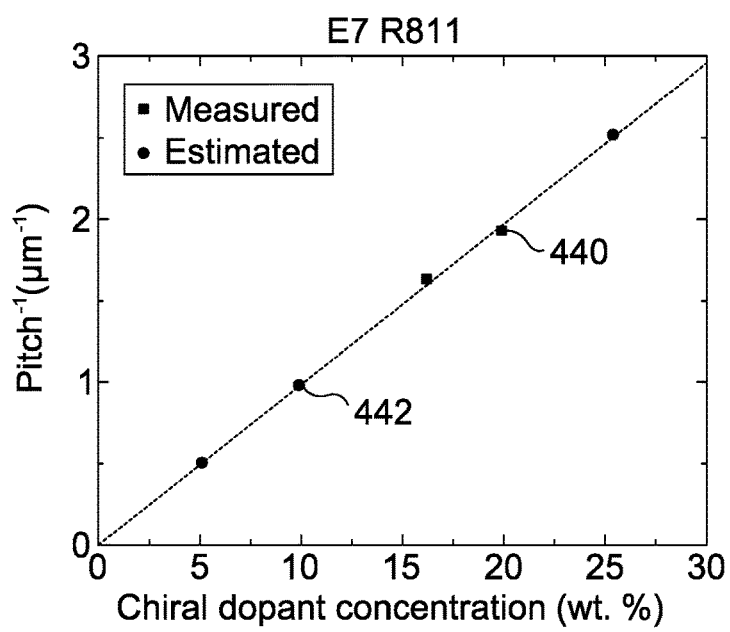
FIG. 15 is a plot of inverse chiral pitch length as a function of wt. % chiral dopant concentration for a third example embodiment.
Figure 16:
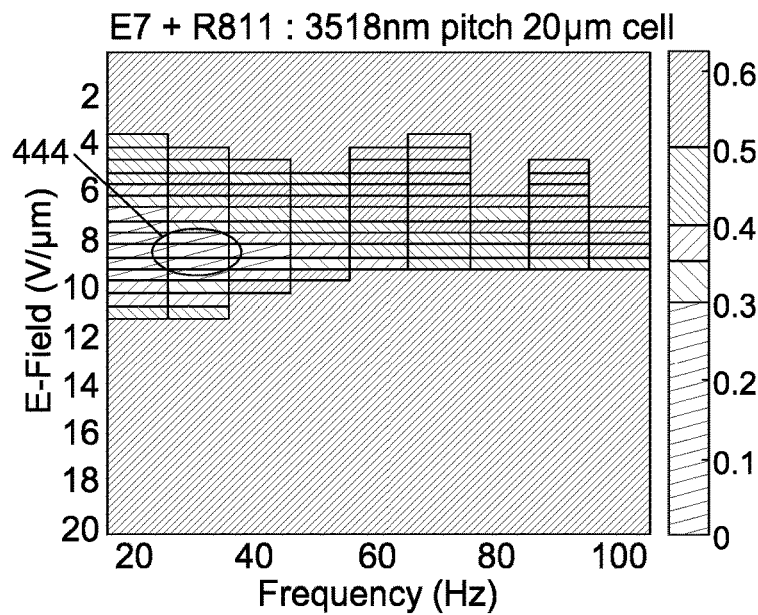
FIG. 16 is a speckle contrast map showing speckle contrast at varying applied electric field strengths and varying applied electric field frequencies for a third example embodiment at 25° C.

The experimental results shown in FIGS. 15 and 16 were obtained for a third example device according to an embodiment. In this third example embodiment the chiral nematic LC composition 114 consisted of the nematic LC E7 premixed with low twisting power chiral dopant R811. This mixture formed a chiral nematic LC phase at room temperature.

FIG. 15 shows a plot of reciprocal chiral pitch length as a function of wt. % concentration chiral dopant R811 for the mixture of E7 with R811. The reciprocal chiral pitch of the chiral nematic LC composition 114 increases linearly with increasing chiral dopant concentration. The data presented includes both measured values 440 and estimated values 442.

FIG. 16 shows a speckle contrast map for chiral nematic LC composition 114 with a chiral pitch length of 518 nm. Again, the speckle contrast map shown in FIG. 16 shows values of speckle contrast measured at varying applied electric field frequency (between 0 Hz and 100 Hz) and varying applied electric field strength (between 0 V/µm and 20 V/µm) at 25° C. A minimum in speckle contrast is seen at an applied electric field strength of 8.5 V and an applied electric field frequency of 30 Hz. This minimum speckle contrast is shown by the outlined region 444. The speckle contrast map of FIG. 16 shows the speckle contrast increasing as the applied electric field strength and applied electric field frequency values are changed away from the region of minimum speckle contrast 444.

FIG. 17 includes a number of plots 450-464 showing minimum speckle contrast and other parameters (transmission, applied electric field strength, applied electric field frequency) at minimum speckle contrast as a function of chiral pitch length. The data presented shows data collected for the second example embodiment and the third example embodiment. Each data point corresponds with the operating conditions (frequency, and field) that give the minimum speckle contrast for that composition. The data from which the plots 450-464 in FIG. 17 are generated is shown in Table 1 below.

| Chiral Dopant | Pitch (nm) | Speckle Contrast | Transmission (%) | Field (V/µm) | Frequency (Hz) |
|---|---|---|---|---|---|
| R811 | 1977 | 0.530 | 30 | 2.3 | 20 |
|  | 1018 | 0.235 | 9 | 4.5 | 20 |
|  | 612 | 0.200 | 16 | 7.1 | 20 |
|  | 518 | 0.178 | 19 | 8.5 | 30 |
|  | 397 | 0.209 | 26 | 9.8 | 20 |
| BDH1281 | 2730 | 0.64 | 46 | 2.0 | 20 |
|  | 1405 | 0.44 | 17 | 3.2 | 20 |
|  | 862 | 0.24 | 5 | 4.8 | 20 |
|  | 517 | 0.14 | 7 | 8.4 | 40 |

-continued

| Chiral Dopant | Pitch (nm) | Speckle Contrast | Transmission (%) | Field (V/µm) | Frequency (Hz) |
|---|---|---|---|---|---|
| | 423 | 0.16 | 11 | 10.0 | 50 |
| | 403 | 0.15 | 13 | 10.4 | 60 |
| | 388 | 0.16 | 14 | 11.0 | 60 |
| | 295 | 0.15 | 18 | 14.8 | 90 |
| | 317 | 0.14 | 16 | 13.6 | 75 |
| | 273 | 0.14 | 22 | 16.2 | 90 |
| | 244 | 0.13 | 17 | 15.8 | 85 |
| | 220 | 0.14 | 19 | 18.0 | 85 |

Figure 17A:
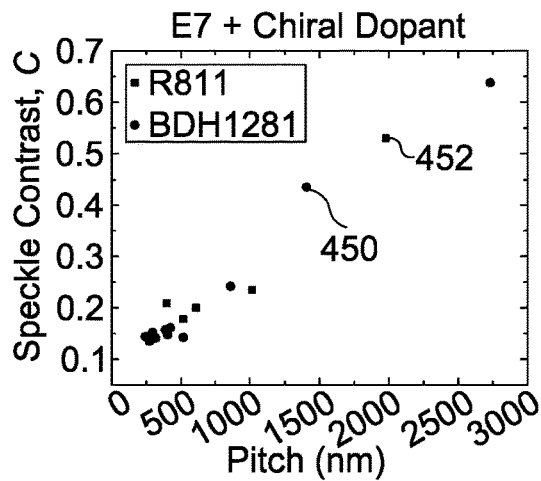
FIG. 17 (a-d) is a number of plots showing parameters (speckle contrast, transmission, applied electric field strength, applied electric field frequency) as a function of chiral pitch length for the second and third example embodiments at 25° C.

FIG. 17a shows plots 450, 452 of speckle contrast as a function of chiral pitch length for the second and third example embodiments respectively. These plots clearly show a linear relationship between speckle contrast and pitch length for the chiral nematic LC compositions 114 of both the second and third example embodiments. LC compositions 114 with a pitch length in the range of approximately 200 nm to approximately 600 nm exhibited similar minimum speckle contrast values.

Figure 17B:
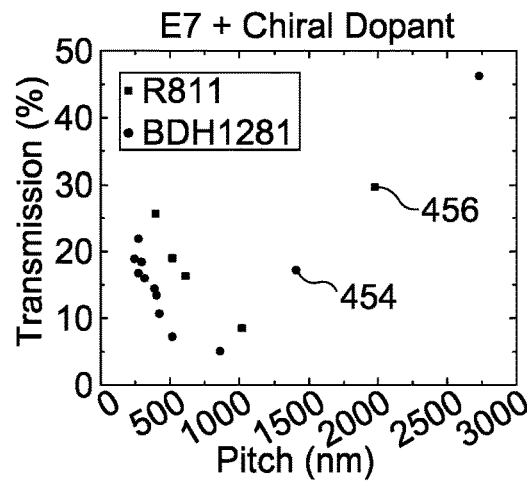

FIG. 17b shows plots 454, 456 of percentage light transmission as a function of chiral pitch length for the second and third example embodiments respectively. These plots show that light transmission approaches a minimum when the pitch length approaches the wavelength of light (633 nm) used to measure the speckle contrast properties of the chiral nematic LC compositions 114.

Figure 17C:
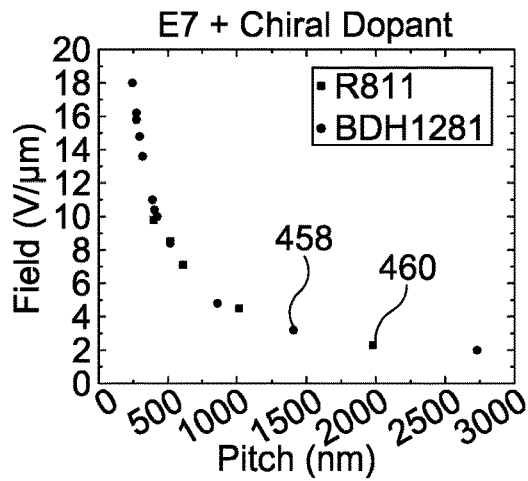

FIG. 17c shows plots 458, 460 of applied electric field strength required for minimum speckle contrast as a function of chiral pitch length for the second and third example embodiments respectively. These plots show that the applied electric field strength required for minimum speckle contrast exponentially decreases as chiral pitch length increases. As with FIG. 15b, a compromise between minimum speckle contrast and energy usage may be required for practical application.

Figure 17D:
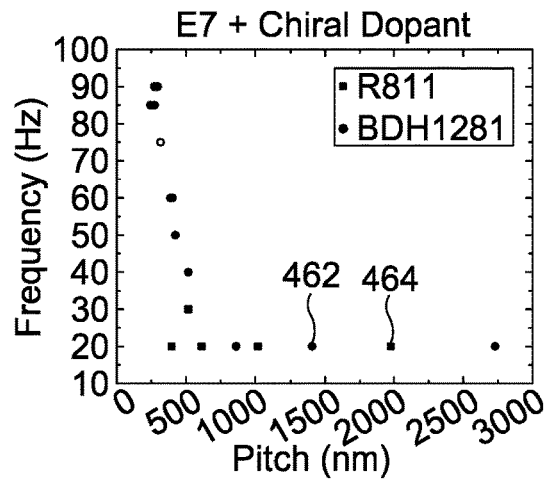

FIG. 17d shows plots 462, 464 of applied electric field frequency required for minimum speckle contrast as a function of chiral pitch length for the second and third example embodiments respectively. These plots show a similar trend to FIG. 15c in that the applied electric field frequency required for minimum speckle contrast decreases as chiral pitch length increases.

FIGS. 17a-d show that similar trends are observed for LC compositions 114 with either a high twisting power chiral dopant (second example embodiment) or low twisting power chiral dopant (third example embodiment).

The data in FIG. 17 indicates that a smaller chiral pitch results in improved speckle contrast reduction, and for chiral pitch <600 nm, smaller chiral pitch also improves light transmission. Against this, smaller chiral pitch results in a requirement for higher field strength to achieve optimal performance. However, it has also been shown that increased operating temperature acts to lower speckle contrast as well as reduce the field strength required for minimum speckle contrast. A compromise between chiral pitch length, operating temperature and applied electric field strength may be preferable to achieve optimal performance of speckle reduction device 100.

Further speckle reduction should be possible using alternative embodiments in which the LC composition has improved properties, such as increased birefringence and conductive anisotropy and faster response time.

In some embodiments, multiple cells may be stacked adjacent to one another, increasing the reduction in speckle contrast without requiring the increased voltage that would be required to produce sufficient electrical field across a thicker gap/LC layer.

Embodiments of the invention have the potential to provide a low cost, lightweight and low power solution to the problem of laser speckle. Example applications for devices of the invention include (but are not limited to): laser projectors (pico-projectors, smartphone projectors, cinema projectors, home cinema projectors, business projectors, holographic displays); machine vision systems (assembly lines, robots, automated inspection, drones, security); microscopy (two photon, confocal etc.); laser machining (micromachining, nanomachining, laser marking); LIDAR (laser radar range finding); free space communications systems; holographic storage systems; and optical measurement systems (e.g. interferometers, low coherence interferometers).

Figure 18:
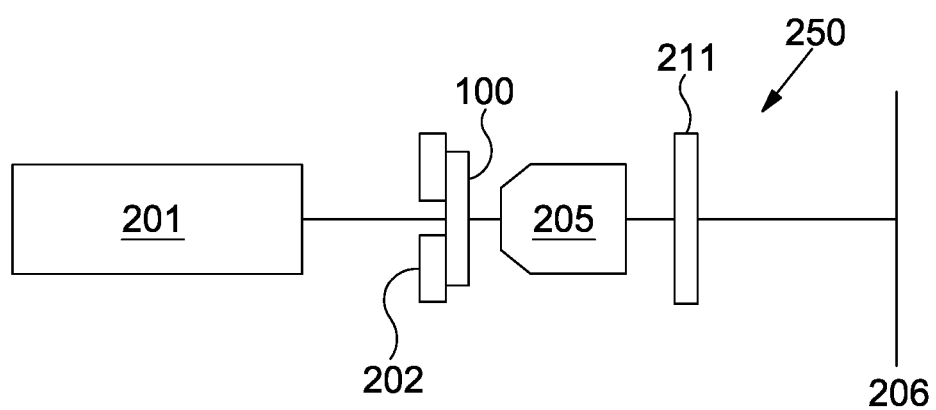
FIG. 18 is a schematic of an image projector according to an embodiment.

FIG. 18 illustrates a projector 250 according to an example embodiment, comprising a coherent light source 201 (e.g. laser), a speckle reduction device 100, objective lens 205, spatial light modulator 211, for projecting an image on a projection screen 206. The speckle reduction device 100 may be as described herein. A temperature controlled mount 202 may be provided for controlling the temperature of the device 100. A low cost, compact projector (e.g. a pico-projector) without perceptible speckle noise may be facilitated by the use of embodiments of the speckle reduction device disclosed herein.

It will be appreciated that speckle resulting from coherent light is not a problem restricted to light in the visible spectrum, and that the invention is applicable to non-visible wavelengths, such as UV and IR.

The cell may take any form that allows a volume of liquid crystal composition to be constrained. For example, it may take the form of a small square or circular element of a few square millimetres for positioning in front of a laser beam, or may be in the form of a large flat panel for a video screen. The cell may be a cavity within other optical elements and devices (for example, lenses, filters) or for example be integral to a laser housing.

Although in the example embodiments shown a square wave drive signal is used, the drive signal may take many forms, for example (without limitation) sinusoidal, triangular, sawtooth, a square wave (or sinusoidal etc.) which varies in frequency and/or amplitude over time, pseudorandom signals, and combinations of signals.

The skilled person will appreciate that other variations are possible, and the example embodiments are not intended to limit the scope of the invention, which should be determined with reference to the accompanying claims.

The invention claimed is:

1. A device for speckle reduction, comprising an optical cell and a controller, wherein:
    the optical cell comprises a first and second cell wall spaced apart by a gap, and a liquid crystal composition in the gap;
        wherein the liquid crystal composition has a chiral nematic phase with a pitch of 50 nm to 1000 nm;
    the controller is configured to cause fluid turbulence in the liquid crystal composition;
    the fluid turbulence in the liquid crystal composition results in time varying spatially random scattering of light transmitted through the liquid crystal composition and
    wherein the liquid crystal composition has positive dielectric anisotropy and wherein the liquid crystal composition has positive anisotropic electrical conductivity.

2. The device of claim 1, wherein: the optical cell comprises a first and second electrode for causing an electric field within the gap; the liquid crystal composition comprises mobile ions; and the controller is configured to apply a voltage between the first and second electrodes to cause an electric field that results in fluid turbulence in the liquid crystal composition due to movement of the mobile ions in response to the electric field.

3. The device of claim 2, wherein the liquid crystal composition further comprises
 (a) a dopant to enhance ionic concentration and reduce the electric field required for dynamic scattering, wherein the dopant comprises at least one of: CTAB, an ionic dopant, an electron donor, or an electron acceptor; and/or
 (b) a redox dopant to improve lifetime of the liquid crystal composition.

4. The device of claim 2, wherein the first and/or second electrode comprise at least one of a transparent conductive material, a transparent conductive oxide, a transparent conductive polymeric material, or graphene.

5. The device of claim 1, wherein the liquid crystal composition:
 i) comprises a chiral dopant to induce chirality; and/or
 ii) is inherently ionic.

6. The device of claim 1, wherein the controller is configured to apply a time varying electric field.

7. The device of claim 6, wherein the controller is configured to apply a time varying voltage to the first and second electrode to cause the time varying electric field.

8. The device of claim 7, wherein a frequency of the time varying electric field is less than 1 kHz.

9. The device of claim 1, wherein the first and second cell walls are substantially parallel, and the gap is between 2 μm and 50 μm.

10. The device of claim 1, wherein the first and/or second cell wall comprises a structured surface adjacent to the liquid crystal composition.

11. The device of claim 1, further comprising a static diffuser.

12. The device of claim 1, wherein the liquid crystal composition comprises nanoparticles or microparticles.

13. The device of claim 1, wherein the liquid crystal composition comprises a viscosity reducing agent.

14. The device of claim 1, wherein the chiral nematic phase has a pitch of at least 200 nm.

15. The device of claim 1, wherein:
 (i) the first and second cell walls are optically transmissive, and the cell is configured to cause time varying spatially random scattering of light transmitted through the first cell wall, the liquid crystal composition and the second cell wall; or
 (ii) the first cell wall is optically reflective, and the cell is configured to cause time varying spatially random scattering of light transmitted through the second cell wall and the liquid crystal composition and reflected from the first cell wall.

16. The device of claim 1, wherein the controller comprises a pump configured to cause the fluid turbulence by pumping the liquid crystal composition.

17. The device of claim 1, further comprising:
 a temperature controlled stage for the optical cell for controlling an operating temperature of the optical cell; and
 a controller configured to operate the temperature controlled stage to keep the liquid crystal composition at an operating temperature that is nearer an upper transition temperature of the chiral nematic phase than a lower transition temperature of the chiral nematic phase.

18. An image projection system, comprising a coherent light source and the device or cell of claim 1, the device or cell configured to reduce speckle contrast in an image projected by the system.

19. An optical cell, comprising: a first and second cell wall spaced apart by a gap, a first and second electrode for causing an electric field within the gap and a liquid crystal composition in the gap comprising mobile ions, wherein the liquid crystal composition has a chiral nematic phase with a pitch of 50 nm to 1000 nm, and wherein the liquid crystal composition is selected to exhibit fluid turbulence due to movement of the mobile ions in response to the electric field such that the fluid turbulence in the liquid crystal composition results in time varying spatially random scattering of light transmitted through the liquid crystal composition, wherein the liquid crystal composition has positive dielectric anisotropy and wherein the liquid crystal composition has positive anisotropic electrical conductivity.

20. A method of speckle reduction, comprising:
 transmitting a coherent light beam through a liquid crystal cell comprising a liquid crystal composition;
  wherein the liquid crystal composition has a chiral nematic phase with a pitch of 50 nm to 1000 nm;
 causing fluid turbulence in the liquid crystal composition, the fluid turbulence scattering causing dynamic scattering of the coherent light beam, wherein the liquid crystal composition has positive dielectric anisotropy and wherein the liquid crystal composition has positive anisotropic electrical conductivity.

* * * * *